(12) United States Patent
Okahara

(10) Patent No.: US 11,162,581 B2
(45) Date of Patent: Nov. 2, 2021

(54) DEVICE AND METHOD FOR CONTROLLING CONTINUOUSLY VARIABLE TRANSMISSION

(71) Applicant: JATCO LTD, Fuij (JP)

(72) Inventor: Ken Okahara, Kanagawa (JP)

(73) Assignee: Jatco Ltd., Fuji (JP)

( * ) Notice: Subject to any disclaimer, the term of this patent is extended or adjusted under 35 U.S.C. 154(b) by 0 days.

(21) Appl. No.: 16/639,947

(22) PCT Filed: Sep. 11, 2018

(86) PCT No.: PCT/JP2018/033562
§ 371 (c)(1),
(2) Date: Feb. 18, 2020

(87) PCT Pub. No.: WO2019/054356
PCT Pub. Date: Mar. 21, 2019

(65) Prior Publication Data
US 2020/0248798 A1    Aug. 6, 2020

(30) Foreign Application Priority Data

Sep. 15, 2017  (JP) .............................. JP2017-178275

(51) Int. Cl.
*F16H 61/66* (2006.01)
*F16H 59/18* (2006.01)
(Continued)

(52) U.S. Cl.
CPC ............. *F16H 61/66* (2013.01); *F16H 59/18* (2013.01); *F16H 59/44* (2013.01); *F16H 59/70* (2013.01); *F16H 59/72* (2013.01)

(58) Field of Classification Search
CPC .......... F16H 61/66; F16H 59/18; F16H 59/44; F16H 59/70; F16H 59/72
See application file for complete search history.

(56) References Cited

U.S. PATENT DOCUMENTS 7,713,166 B2 * 5/2010 Frank .................... B60W 10/08
477/45
8,843,287 B2 * 9/2014 Doihara ............ F16H 61/66272
701/60
(Continued)

FOREIGN PATENT DOCUMENTS

JP     2002-005274 A    1/2002
JP     2002-106700 A    4/2002
(Continued)

OTHER PUBLICATIONS

JP2011207240A (A Noriki) Vehicle COntrol System (Oct. 20, 2011).*

*Primary Examiner* — Tinh Dang
(74) *Attorney, Agent, or Firm* — Global IP Counselors, LLP

(57) ABSTRACT

A control device for a continuously variable transmission performs feedback control so that an actual transmission control value becomes a target transmission control value. The control device for a continuously variable transmission includes a phase lead compensation unit configured to perform phase lead compensation of the feedback control, a phase delay compensation unit configured to perform phase delay compensation of the feedback control, and a phase compensation on/off determination unit configured to stop the phase delay compensation by the phase delay compensation unit when an unstable traveling state of a vehicle is detected, and to restore the phase delay compensation when a traveling state of the vehicle has changed.

12 Claims, 8 Drawing Sheets

(51) Int. Cl.
    *F16H 59/44*     (2006.01)
    *F16H 59/70*     (2006.01)
    *F16H 59/72*     (2006.01)
    *F16H 61/662*     (2006.01)

(56) References Cited

U.S. PATENT DOCUMENTS

| | | | | |
|---|---|---|---|---|
| 8,892,318 B2 * | 11/2014 | Doihara | ............ | F16H 61/66272 701/55 |
| 8,914,200 B2 * | 12/2014 | Doihara | ............ | F16H 61/66272 701/51 |
| 8,914,201 B2 * | 12/2014 | Doihara | ............ | F16H 61/66272 701/51 |
| 8,914,203 B2 * | 12/2014 | Kodama | ........... | F16H 61/66272 701/51 |
| 8,914,204 B2 * | 12/2014 | Kodama | ........... | F16H 61/66272 701/51 |
| 9,212,742 B2 * | 12/2015 | Doihara | .............. | B60W 10/107 |
| 2002/0155910 A1 * | 10/2002 | Nishizawa | ........ | F16H 61/66272 474/69 |
| 2019/0078685 A1 | 3/2019 | Kawasumi et al. | | |

FOREIGN PATENT DOCUMENTS

| | | | | |
|---|---|---|---|---|
| JP | 2011-207240 A | | 10/2011 | |
| JP | 2011207240 A | * | 10/2011 | ............ B60W 10/04 |
| JP | 6065490 B2 | | 1/2017 | |
| JP | 2017-160982 A | | 9/2017 | |

\* cited by examiner

DEVICE AND METHOD FOR CONTROLLING CONTINUOUSLY VARIABLE TRANSMISSION

CROSS-REFERENCE TO RELATED APPLICATIONS

This is a U.S. national phase application of PCT/JP2018/033,562, filed on Sep. 11, 2018, which claims priority to Japanese Patent Application No. 2017-178275, filed on Sep. 15, 2017. The entire disclosure of Japanese Patent Application No. 2017-178275 is hereby incorporated herein by reference.

TECHNICAL FIELD

The present invention relates to a control device and a control method for a continuously variable transmission mounted in a vehicle.

BACKGROUND ART

In Japanese Unexamined Patent Publication No. 2002-106700, disclosed is a technique relating to transmission control of a continuously variable transmission, that does lead compensation of a target transmission ratio by the amount of response delay of the actual transmission ratio with respect to the target transmission ratio.

With the continuously variable transmission, there are cases when vibration is caused in the longitudinal direction by the resonance frequency of the powertrain. When there is insufficient stability of the transmission ratio of the continuously variable transmission with respect to torque fluctuation of the powertrain, longitudinal vibration conceivably occurs linked with the torque fluctuation and gear shifting of the continuously variable transmission. For this reason, lead compensation is performed, and it is conceivable that by increasing the stability of the transmission ratio of the continuously variable transmission, in other words, damping, it is possible to suppress longitudinal vibration. As lead compensation, it is conceivable to fix the lead amount for the peak value frequency and perform lead compensation. The peak value frequency is the frequency at which the lead amount according to frequency shows a peak. However, depending on the operating state of the vehicle, there is the risk that the lead amount may be insufficient, and that sufficient damping performance cannot be obtained. On the other hand, with lead compensation, when the lead amount is made larger, high frequency gain becomes larger, so if the lead amount is too large, there was the problem that the transmission ratio control system becomes unstable.

The purpose of the present invention is to provide a control device of a continuously variable transmission for which it is possible to obtain a damping effect while ensuring stability of the transmission ratio of the continuously variable transmission that performs lead compensation.

SUMMARY

The present invention is a control device for a continuously variable transmission that performs feedback control so that an actual transmission control value becomes a target transmission control value, comprising:
a phase lead compensation unit that performs phase lead compensation of the feedback control,
a phase delay compensation unit that performs phase delay compensation of the feedback control, and
a phase compensation on/off determination unit that stops compensation by the phase delay compensation unit when an unstable traveling state of the vehicle is detected, and restores the delay compensation when the traveling state of the vehicle has changed.

Thus, stabilization of control becomes possible, and it is possible to stabilize vehicle behavior.

DETAILED DESCRIPTION OF EMBODIMENTS

Figure 1:
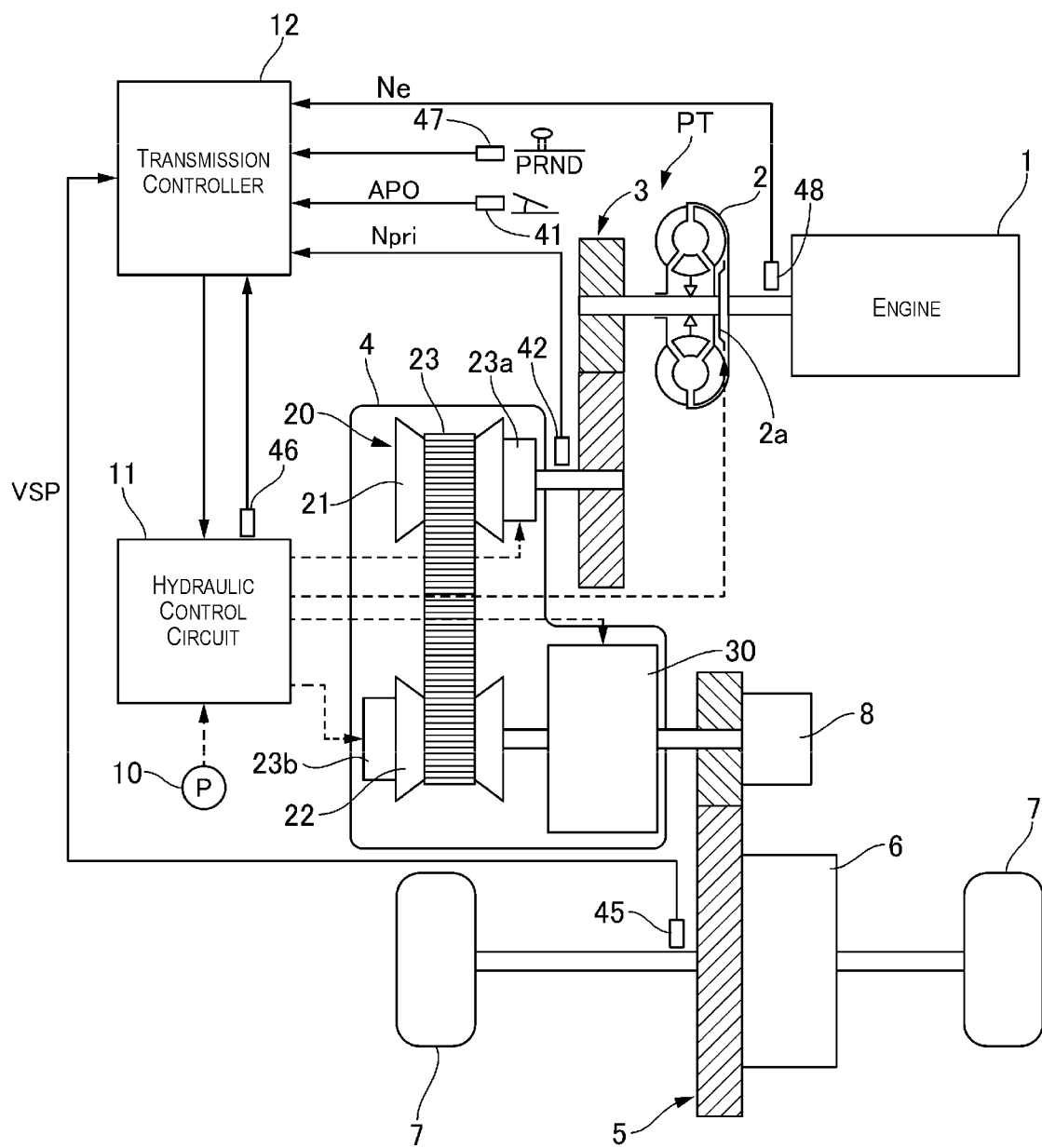
FIG. 1 is a schematic block diagram of a vehicle including a transmission controller of an embodiment.

FIG. 1 is a schematic block diagram of a vehicle including a transmission controller of an embodiment. The vehicle comprises an engine 1 as a power source. The power of the engine 1 is transmitted to a drive wheel 7 via a torque converter 2, a first gear train 3, a transmission 4, a second gear train (final gear) 5, and a differential device 6 configuring a powertrain PT. A parking mechanism 8 that mechanically locks the output shaft of the transmission 4 to be non-rotatable when parking is provided on the second gear train 5.

The torque converter 2 has a lock-up clutch 2*a*. When the lock-up clutch 2*a* is engaged, there is no slipping of the torque converter 2, and the transmission efficiency of the torque converter 2 improves. Hereafter, the lock-up clutch 2*a* is noted as LU clutch 2*a*.

The transmission 4 is a continuously variable transmission having a variator 20. The variator 20 has a pulley 21 that is the primary pulley, a pulley 22 that is the secondary pulley, and a belt 23 that is stretched around between the pulleys 21, 22. The pulley 21 configures a driving side rotation element, and the pulley 22 configures a driven side rotation element.

The pulleys 21, 22 respectively have: a fixed conical plate, a movable conical plate that is placed opposing a sheave surface with respect to the fixed conical plate and that forms a V-groove with the fixed conical plate, and a hydraulic cylinder that is provided on the back surface of the movable conical plate and that displaces the movable conical plate in the axial direction. The pulley 21 has a hydraulic cylinder 23a, and the pulley 22 has a hydraulic cylinder 23b.

When the hydraulic pressure supplied to the hydraulic cylinders 23a, 23b is adjusted, the V-groove width changes, the contact radius between the belt 23 and each pulley 21, 22 changes, and the transmission ratio of the variator 20 changes continuously. The variator 20 may also be a toroidal type continuously variable transmission.

The transmission 4 further comprises a sub transmission mechanism 30. The sub transmission mechanism 30 is a transmission mechanism of two forward gears and one reverse gear, and as the forward transmission gears, there is $1^{st}$ gear, and $2^{nd}$ gear that has a smaller transmission ratio than $1^{st}$ gear. The sub transmission mechanism 30 has the variator 20 provided in series in the power transmission path from the engine 1 to the drive wheel 7. The sub transmission mechanism 30 may be directly connected to the output shaft of the variator 20 as shown in this example, and may also be connected via a power transmission mechanism such another gear shift or a gear train, etc. Alternatively, the sub transmission mechanism 30 may also be connected to the input shaft side of the variator 20.

The vehicle has: an oil pump 10 that is driven using a portion of the power of the engine 1, a hydraulic control circuit 11 that adjusts the hydraulic pressure generated by the oil pump 10 and supplies that to each part of the transmission 4, and a transmission controller 12 that controls the hydraulic control circuit 11. The hydraulic control circuit 11 is configured from a plurality of flow paths and a plurality of hydraulic control valves. The hydraulic control circuit 11 controls the plurality of hydraulic control valves to switch the hydraulic supply path based on transmission control signals from the transmission controller 12. Also, the hydraulic control circuit 11 adjusts the necessary hydraulic pressure from the hydraulic pressure generated by the oil pump 10, and supplies the adjusted hydraulic pressure to each part of the transmission 4. By doing this, shifting of the variator 20, changing of the gears of the sub transmission mechanism 30, and engagement and release of the LU clutch 2a are performed.

Figure 2:
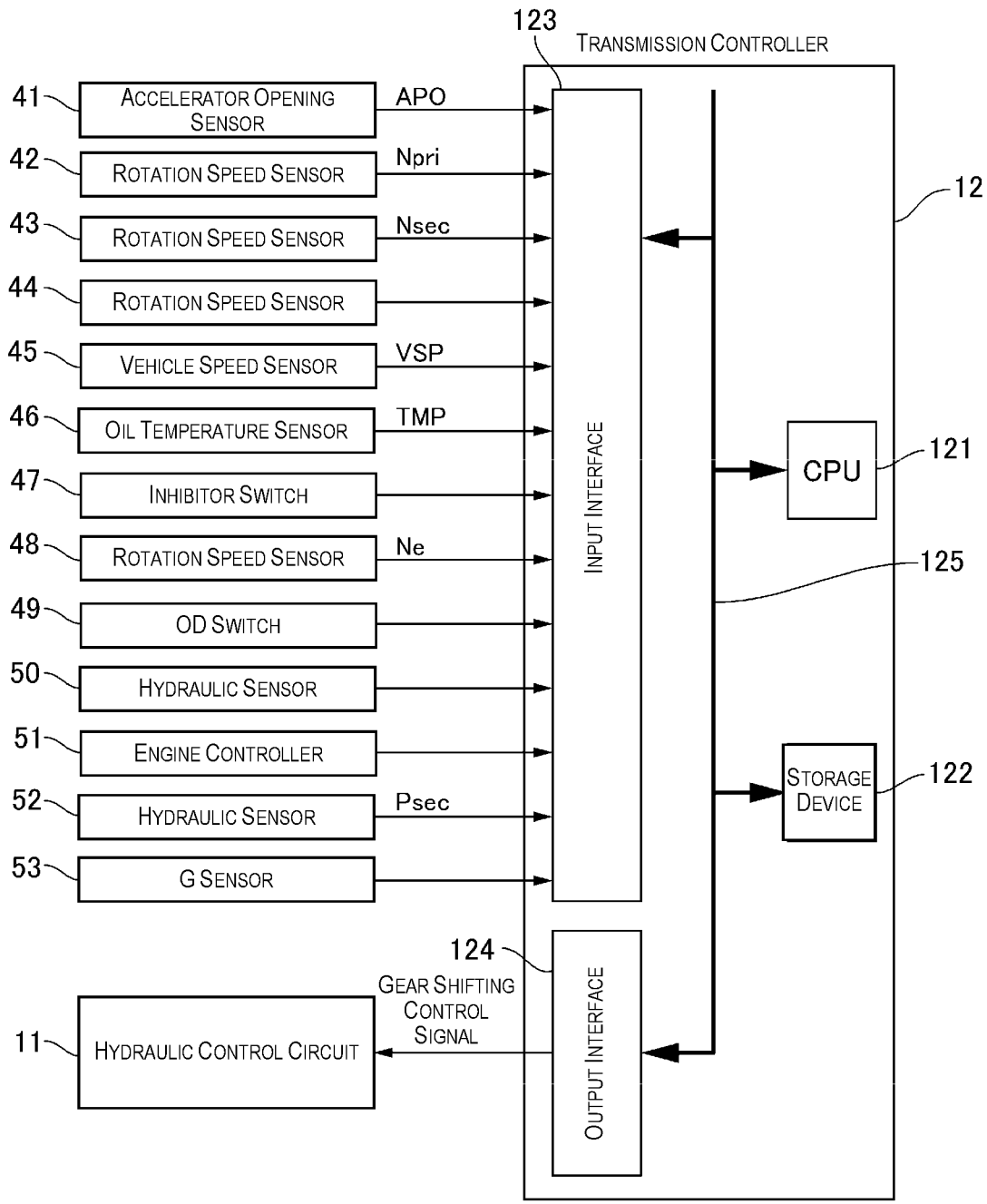
FIG. 2 is a schematic block diagram of the transmission controller of the embodiment.

FIG. 2 is a schematic block diagram of the transmission controller 12 of the embodiment. The transmission controller 12 has: a Central Processing Unit (CPU) 121, a storage device 122 comprising RAM•ROM, an input interface 123, an output interface 124, and a bus 125 that connects these to each other.

The input interface 123 has input, for example, the output signal of an accelerator opening sensor 41 that detects an accelerator opening APO expressing the operating amount of an accelerator pedal, an output signal of a rotation speed sensor 42 that detects the input side rotation speed of the transmission 4, an output signal of a rotation speed sensor 43 that detects a rotation speed Nsec of the pulley 22, and an output signal of a rotation speed sensor 44 that detects the output side rotation speed of the transmission 4.

The input side rotation speed of the transmission 4, in specific terms, is the rotation speed of the input shaft of the transmission 4, in other words, rotation speed Npri of the pulley 21. The output side rotation speed of the transmission 4, in specific terms, is the rotation speed of the output shaft of the transmission 4, in other words, the rotation speed of the output shaft of the sub transmission mechanism 30. The input side rotation speed of the transmission 4, for example, may also be the rotation speed of a position sandwiching the gear train, etc. with the transmission 4, such as the turbine rotation speed of the torque converter 2, etc. The same is also true for the output side rotation speed of the transmission 4.

The input interface 123 has input, for example, an output signal of a vehicle speed sensor 45 that detects a vehicle speed VSP, an output signal of an oil temperature sensor 46 that detects an oil temperature TMP of the transmission 4, an output signal of an inhibitor switch 47 that detects the position of a select lever, an output signal of a rotation speed sensor 48 that detects a rotation speed Ne of the engine 1, an output signal of an OD switch 49 for expanding the transmission range of the transmission 4 to a transmission ratio smaller than 1, an output signal of a hydraulic sensor 50 that detects the hydraulic pressure supplied to the LU clutch 2a, an output signal of a hydraulic sensor 52 that detects a secondary pressure Psec that is the hydraulic pressure supplied to the pulley 22, an output signal of a G sensor 53 that detects the longitudinal acceleration of the vehicle, etc. Also input to the input interface 123 are torque signals of engine torque Te from an engine controller 51 that controls the engine 1.

Stored in the storage device 122 are a transmission control program of the transmission 4, and various types of maps, etc. used for the transmission control program. The CPU 121 reads and executes the transmission control program stored in the storage device 122, and generates transmission control signals based on various types of signals input via the input interface 123. Also, the CPU 121 outputs the generated transmission control signals to the hydraulic control circuit 11 via the output interface 124. Various types of values used with the calculation processing by the CPU 121 and the calculation results of the CPU 121 are stored as appropriate in the storage device 122.

The transmission 4 may generate longitudinal vibration at a PT resonance frequency Fpt that is the resonance frequency of the powertrain PT. The longitudinal vibration is thought to occur with coupling of torque fluctuation and shifting of the transmission 4 when there is insufficient stability of the torque fluctuation and the transmission ratio of the transmission 4, in cases when there is insufficient stability of the transmission ratio of the transmission 4 with respect to torque fluctuation of the powertrain PT. For this reason, lead compensation is performed, stability of the transmission ratio of the transmission 4 is ensured, and by increasing damping, the longitudinal vibration is suppressed.

However, depending on the traveling state of the vehicle, a sufficient damping effect using lead compensation cannot be obtained. Specifically, depending on the operating state of the vehicle, there were times when the lead amount A was insufficient, and a sufficient damping effect could not be obtained. On the other hand, the damping effect tends to become greater the more the lead amount Apk of the peak value frequency Fpk increases. For this reason, it is conceivable to make the lead amount Apk according to frequency be variable according to the operating state of the vehicle. However, when the lead amount Apk is increased, the gain G also increases, so if the lead amount Apk is made too large, there is concern that a transmission ratio control system 100 described later will be come unstable. Also, the stability of the transmission ratio control system 100 differs according to the operating state of the vehicle.

On the other hand, when the lead amount Apk is made larger, when the state of the transmission controller 12 changes, there are cases when the lead amount Apk becomes unsuitable. In light of that, in addition to phase lead compensation, it is desirable to perform phase delay compensation. However, depending on the operating state of the vehicle, there is concern that there will be an insufficient delay amount B, and that vehicle vibration will occur due to PT resonance. Also, when there is too much delay amount B, there is the risk that the control system will become unstable, and low frequency control excitation will occur.

In light of that, the transmission controller 12 (hereafter also noted as controller 12) performs the transmission control explained hereafter. Hereafter, use of a transmission ratio Ratio of the variator 20 as the transmission ratio of the transmission 4 is explained. The transmission ratio Ratio is a collective name for the transmission ratios of the variator 20 including actual transmission ratio Ratio_A, target transmission ratio Ratio_D, and reached transmission ratio Ratio_T described hereafter.

Figure 3:
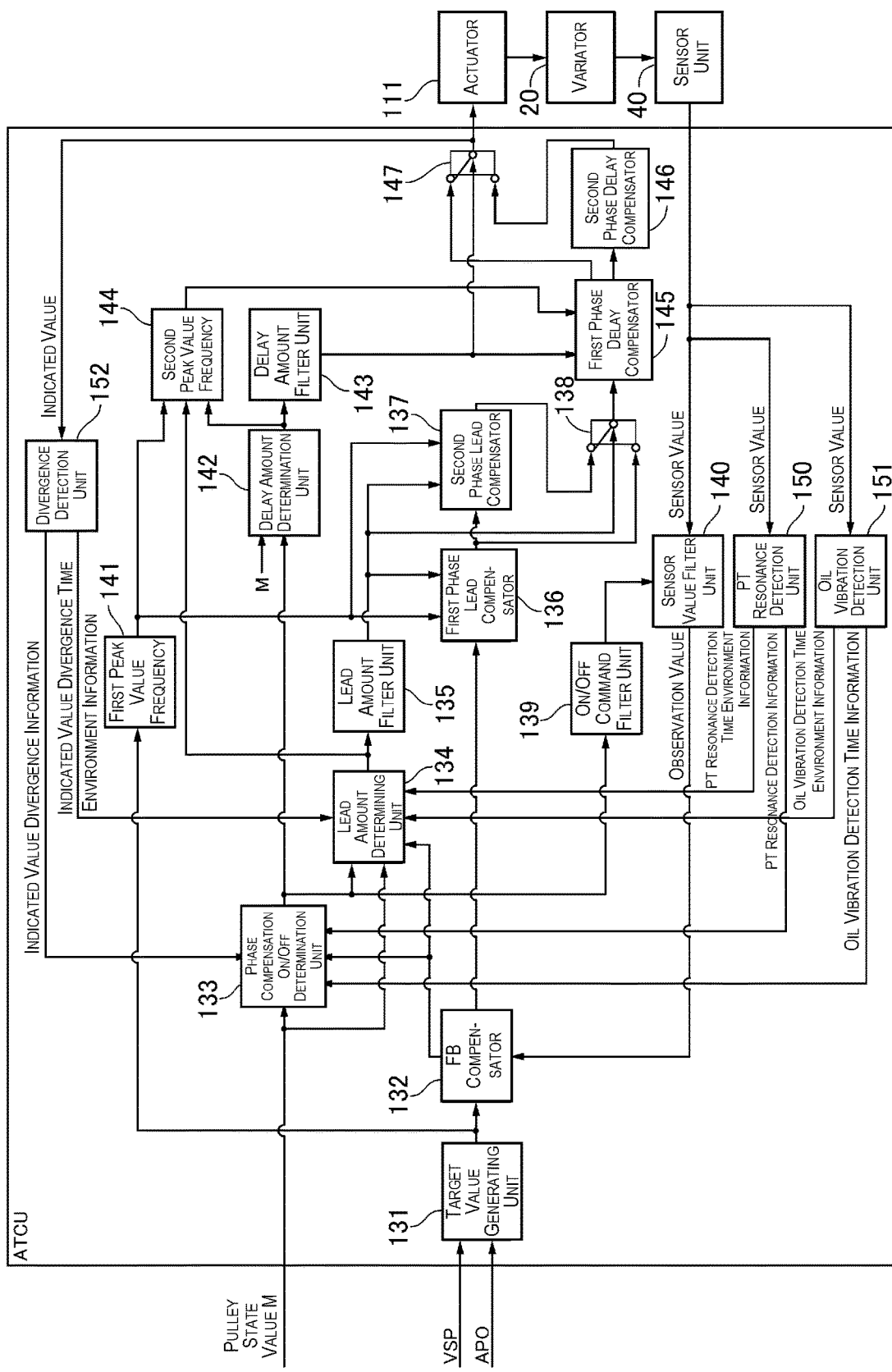
FIG. 3 is a drawing showing an example of a block diagram showing the main parts of a transmission ratio control system.

FIG. 3 is a control block diagram showing the main parts of the transmission ratio control system of the embodiment. The transmission ratio control system 100 performs feedback transmission control of the transmission 4 by performing transmission ratio control of the transmission 4 so that the actual transmission control value becomes the target transmission control value. The transmission ratio control system 100 is configured from the controller 12, an actuator 111, and the variator 20.

The controller 12 has: a target value generating unit 131; an FB compensator 132; a phase compensation on/off determination unit 133; a lead amount determining unit 134; a lead amount filter unit 135; a first phase lead compensator 136; a second phase lead compensator 137; a first switching unit 138; an on/off command filter unit 139; a sensor value filter unit 140; a first peak value frequency determination unit 141; a delay amount determination unit 142; a delay amount filter unit 143; a second peak value frequency determination unit 144; a first phase delay compensator 145; a second phase delay compensator 146; a second switching unit 147; a PT resonance detection unit 150; an oil vibration detection unit 151; and a divergence detection unit 152. FB is an abbreviation for feedback.

The target value generating unit 131 generates a target value for the transmission control. In specific terms, the target value is the target transmission ratio Ratio_D based on the reached transmission ratio Ratio_T which is the final target transmission control value with the transmission ratio Ratio as the transmission control value. The transmission control value may also be a primary pressure Ppri as a control parameter, for example. The reached transmission ratio Ratio_T is preset according to the operating state of the vehicle with a shift map. For this reason, the target value generating unit 131 reads the corresponding reached transmission ratio Ratio_T from the shift map based on the detected operating state. In specific terms, the operating state of the vehicle uses vehicle speed VSP and accelerator opening APO.

The target value generating unit 131 calculates the target transmission ratio Ratio_D based on the reached transmission ratio Ratio_T. The target transmission ratio Ratio_D is a transient target transmission ratio in the time until becoming the reached transmission ratio Ratio_T, and configures the target transmission control value. The calculated target transmission ratio Ratio_D is input to the FB compensator 132.

The FB compensator 132 calculates the feedback command value based on the actual transmission ratio Ratio_A which is the actual value of the transmission ratio Ratio, and the target transmission ratio Ratio_D. The feedback command value is, for example, a feedback primary indicated pressure Ppri_FB for eliminating an error of the actual transmission ratio Ratio_A and the target transmission Ratio_D. With the FB compensator 132, FB gain G_FB is variable. The FB gain G_FB is the FB gain of the transmission ratio control of the transmission 4 performed by the transmission ratio control system 100, and is variable according to the operating state of the vehicle. The operating state of the vehicle is the transmission ratio Ratio, a rate of change α of the transmission ratio Ratio, an input torque Tpri, etc., for example. The rate of change α of the transmission ratio Ratio, said another way, is the gear shifting speed. The feedback command value calculated by the FB compensator 132 (feedback primary indicated pressure Ppri_FB) is input to the lead amount determining unit 134, and the first phase lead compensator 136.

The phase compensation on/off determination unit 133 determines on/off of the phase lead compensation and the phase delay compensation of the feedback primary indicated pressure Ppri_FB. The phase compensation on/off determination unit 133 determines on/off of the phase compensation according to a pulley state value M, the indicated value divergence information of a divergence detection unit 152 described later, the FB gain G_FB, the oil vibration detection information of the oil vibration detection unit 151 described later, the PT resonance information of the PT resonance detection unit 150 described later, and the target transmission ratio Ratio_D. The pulley state value M is a value for determining whether pulleys 21, 22 are in a state for which longitudinal vibration occurs, and includes rotation speed Npri, input torque Tsec to the pulley 22, transmission ratio Ratio, and rate of change α of the transmission ratio Ratio. The input torque Tsec can be calculated as a value for which the transmission ratio (gear ratio of the first gear train 3 and transmission ratio of the variator 20) set between the engine 1 and the pulley 22, for example, is multiplied by the engine torque Te. For the transmission ratio Ratio, it is possible to apply the actual transmission ratio Ratio_A and the target transmission ratio Ratio_D. The transmission ratio Ratio may also be the actual transmission ratio Ratio_A or the target transmission ratio Ratio_D.

In specific terms, the phase compensation on/off determination unit 133 determines on/off of the phase lead compensation and phase delay compensation of the feedback primary indicated pressure Ppri_FB according to all four parameters of the rotation speed Npri, the input torque Tsec, the transmission ratio Ratio, and the rate of change a. The phase compensation on/off determination unit 133 may also be configured to determine on/off of the phase lead compensation and phase delay compensation according to any one of the parameters of the input torque Tsec, the transmission ratio Ratio, and the rate of change α. The phase compensation on/off determination unit 133, in addition to the pulley state value M, determines on/off of the phase compensation of the feedback primary indicated pressure Ppri_FB also according to the engagement state of the LU clutch 2a, the state of driver operation with respect to the transmission ratio 4, and the presence or absence of failure.

Here, a detailed description is given regarding processing within the phase compensation on/off determination unit 133. With the phase compensation on/off determination unit 133, the following combination of states can be achieved.

(State 1) Phase Lead Compensation On, Phase Delay Compensation On

State 1 is a state for which even if both phase lead compensation and phase delay compensation are executed, indicated value divergence is not detected by the divergence detection unit 152, oil vibration is not detected by the oil vibration detection unit 151, and PT resonance is not detected by the PT resonance detection unit 150.

(State 2) Phase Lead Compensation On, Phase Delay Compensation Off

State 2 is a state that shifts when a state is detected by the PT resonance detection unit 150 in which the amplitude of a prescribed frequency (0.5 Hz, for example) representing low frequency vibration is large, and control excitation occurs due to the effect of the delay amount. Specifically, by having only the phase delay compensation off, control excitation of the low frequency side is avoided.

(State 3) Phase Lead Compensation Off, Phase Delay Compensation Off

State 3 is a state that shifts when indicated value divergence is detected by the divergence detection unit 152, or oil vibration is detected by the oil vibration detection unit 151, or vehicle vibration (2 to 5 Hz frequency vibration, for example) is detected by the PT resonance detection unit 150, and a state in which phase compensation is inappropriate is detected. In this case, the LU clutch 2a is also released. This is because since the PT resonance frequency Fpt has a correlation with the mass of the power transmission path, by releasing the LU clutch 2a, it is possible to move the PT resonance frequency Fpt, and possible to suppress vibration. Specifically, when divergence or oil vibration is detected, by turning off both phase lead compensation and phase delay compensation, divergence of the indicated value and oil vibration are avoided.

Next, when in state 3, with the phase compensation left off, it is not possible to engage the LU clutch 2a, so there is concern that operability or fuel consumption will be degraded. In light of that, the following restoration conditions are set.

(Restoration Condition 1) Detection by Each Detection Unit Ended

When the indicated value divergence or oil vibration detected by each detection unit has ended, when it is judged that the vehicle state has changed, the phase lead compensation and the phase delay compensation are turned on.

(Restoration Condition 2) Change in Operating Point M

A vibration phenomenon such as resonance, etc., is a phenomenon that occurs dependent on operating point M determined by the vehicle speed or accelerator pedal opening, so when the operating point M moves from the operating point at the time of vibration occurrence to another operating point, the phase lead compensation and phase delay compensation are turned on, and re-engagement of the LU clutch 2a is enabled.

(Restoration Condition 3) Change in Range Position Signal

When the D range is changed to the N range, etc., the state of the powertrain changes, so there is a high possibility of being able to avoid a vibration phenomenon. Thus, when the range position signal is changed, output of the phase compensation signals is resumed, and re-engagement of the LU clutch 2a is enabled. By doing this, it is easier to ensure phase compensation and an engaged state of the LU clutch 2a during traveling, and it is possible to improve fuel consumption while ensuring controllability.

(Restoration Prohibition Condition) When Shifting from Vehicle Vibration to State 3

When shifted to state 3 due to oil vibration, this is a state in which vibration does not necessarily appear in vehicle behavior, and even if re-engagement of the LU clutch 2a is performed, the effect on vehicle behavior is small. On the other hand, when shifted to state 3 due to vehicle vibration, there is a risk that vehicle vibration will occur again due to re-engagement of the LU clutch 2a. Thus, re-engagement of the LU clutch 2a is prohibited until next time the ignition switch is turned off.

Returning to FIG. 3, the phase compensation on/off determination unit 133 outputs an on command when phase compensation on is determined, and outputs an off command when phase compensation off is determined. The on/off command is input from the phase compensation on/off determination unit 133 to the lead amount determining unit 134 and the on/off command filter unit 139.

The lead amount determining unit 134 determines the lead amount Apk. The lead amount determining unit 134 is provided in the wake of the phase compensation on/off determination unit 133. The lead amount determining unit 134 is provided in this way in light of placement in the signal path. The lead amount determining unit 134 determines the lead amount Apk according to the on/off command, said another way, according to the on/off determination of the phase compensation. The lead amount determining unit 134 determines the lead amount Apk to be zero when the off command is input. The lead amount determining unit 134 determines the lead amount Apk according to the operating state of the vehicle when the on command is input. As parameters indicating the operating state of the vehicle, input to the lead amount determining unit 134 are the FB gain G_FB, the rotation speed Npri, the input torque Tsec, the transmission ratio Ratio, the secondary pressure Psec, and the oil temperature TMP. The lead amount determining unit 134 determines the lead amount Apk according to this plurality of parameters. Said another way, the lead amount Apk is made to be variable according to the operating state of the vehicle. The lead amount determining unit 134 may also have the lead amount Apk be variable according to at least one of this plurality of parameters.

By determining the lead amount Apk according to each parameter, the lead amount determining unit 134 can be made to be variable according to the operating state, and it is possible to set the lead amount A at a targeted frequency. When increasing the lead amount A, the range at which stable operation is possible is limited considering the relationship with specific specifications of the transmission ratio control system 100 such as the variator 20. This limit can be found in advance by calculation or experimentation as a limit amount according to each parameter. The lead amount Apk can be determined by further reducing the lead amount Apk actually determined according to each parameter by the amount of the limit amount set according to each parameter.

The lead amount determining unit 134 determines a first lead amount Apk1 and a second lead amount Apk2 based on the determined lead amount Apk. The first lead amount Apk1 is set corresponding to when performing the primary phase lead compensation described later, and the second lead amount Apk2 is set corresponding to when performing the secondary phase lead compensation described later. The second lead amount Apk2 is ½ of the first lead amount Apk1. The lead amount Apk determined according to each parameter is set so as to correspond to the second lead amount Apk2. The lead amount Apk determined according to each parameter may also be set so as to correspond to the first lead amount Apk1. The lead amount Apk is input from the lead amount determining unit 134 to the lead amount filter unit 135.

The lead amount filter unit 135 is provided in the wake of the lead amount determining unit 134, and performs filter processing of the lead amount Apk. The lead amount filter unit 135 is provided in this way in light of placement in the signal path. The lead amount filter unit 135 is specifically a low pass filter unit, and is configured as a first order low pass filter, for example. The lead amount filter unit 135 configures a gain smoothing unit that performs smoothing of changes of the gain G of the phase compensation according to determination of on/off of the phase compensation by performing filter processing of the lead amount Apk when on/off of the lead compensation is switched. By performing smoothing of changes in the gain G, the change amount of the gain G accompanying on/off switching of the phase compensation is suppressed.

Specifically, when the lead amount A changes, for example, when the gain of sensor noise of 30 Hz is changed by 20 Hz, components of 10 Hz and 50 Hz are generated by the addition theorem. Here, the 10 Hz component may cause self-excited vibration for which the input vibration is not attenuated. Specifically, when there is high frequency gain change at high frequency, low frequency is created, stimulating self-excited vibration that responds to low frequency. In light of that, a cutoff frequency is set based on the frequency of the sensor noise and the frequency of the self-excited vibration, and filter processing is performed by a low pass filter of this cutoff frequency. By doing this, the occurrence of self-excited vibration is avoided.

The lead amount Apk is input from the lead amount filter unit 135 to the first phase lead compensator 136, the second phase lead compensator 137, and the first switching unit 138. The peak value frequency Fpk from the first peak value frequency determination unit 141 is also input to the first phase lead compensator 136 and the second phase lead compensator 137. Based on the lead amount Apk input to both the first phase lead compensator 136 and the second phase lead compensator 137, and also the peak value frequency Fpk, primary phase lead compensation of the feedback primary indicated pressure Ppri_FB is performed. By performing phase lead compensation of the feedback primary indicated pressure Ppri_FB, phase lead compensation of the feedback transmission control of the transmission 4 is performed. The first phase lead compensator 136 and the second phase lead compensator 137 are specifically configured by a primary filter, and by performing filter processing according to the inputted lead amount Apk and the further inputted peak value frequency Fpk, the primary phase lead compensation of the feedback primary indicated pressure Ppri_FB is performed.

The second phase lead compensator 137 is provided in series with the first phase lead compensator 136. The second phase lead compensator 137 is provided in this way in light of placement in the signal path. The second phase lead compensator 137 has the feedback primary indicated pressure Ppri_FB for which primary phase lead compensation was performed by the first phase lead compensator 136 input. Therefore, the second phase lead compensator 137 further performs again the primary phase lead compensation when performing the primary phase lead compensation of the feedback primary indicated pressure Ppri_FB. By doing this, the secondary phase lead compensation of the feedback primary indicated pressure Ppri_FB is performed. The second phase lead compensator 137 configures the lead compensation unit together with the first phase lead compensator 136.

The first switching unit 138 switches between when performing phase lead compensation with the first phase lead compensator 136 and the second phase lead compensator 137 according to the input lead amount Apk, in other words, when performing secondary phase lead compensation, and when performing phase lead compensation only with the first phase lead compensator 136, in other words, when performing primary phase lead compensation.

Figure 4:
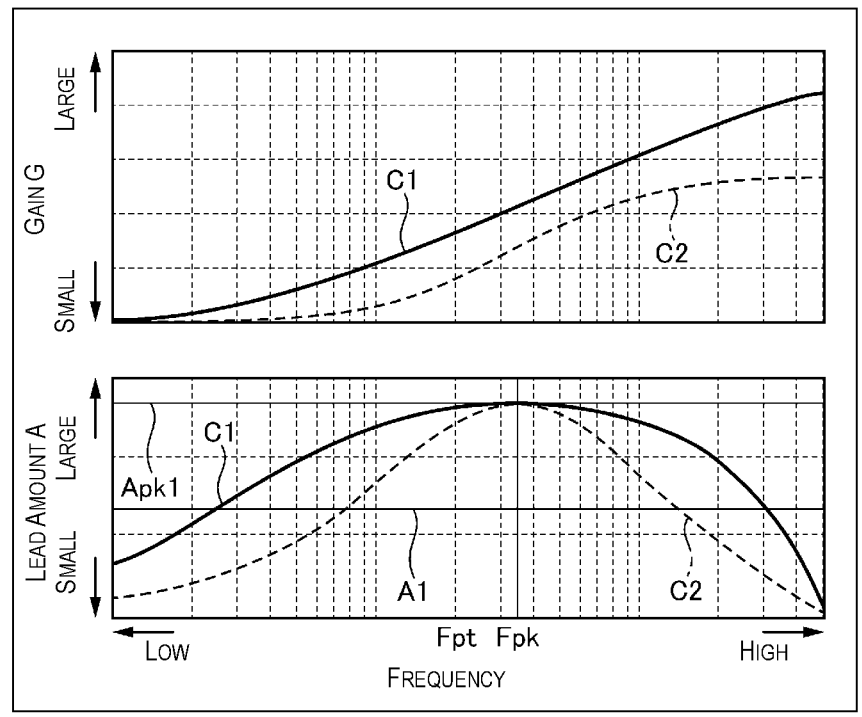
FIG. 4 is a drawing showing an example of a Bode diagram of a phase lead compensator.
Figure 5:
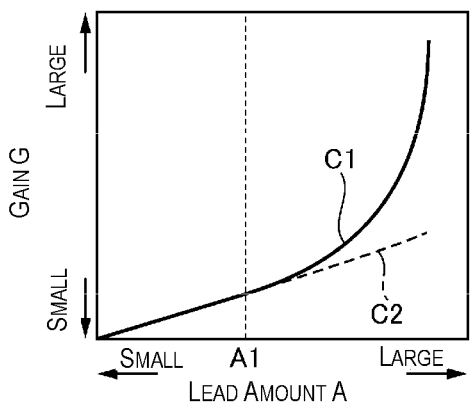
FIG. 5 is a drawing showing an example of gain change at a prescribed frequency of the phase lead compensator.

FIG. 4 is a drawing showing an example of a Bode diagram of the phase lead compensator. FIG. 5 is a drawing showing an example of gain change at a prescribed frequency of the phase lead compensator. In FIG. 4, the horizontal axis shows the frequency as a logarithm. In FIGS. 4 and 5, solid line C1 shows a case of a primary phase lead compensator, and dashed line C2 shows a case of a secondary phase lead compensator. In both the primary and secondary cases, the phase lead compensator is set so that the lead amount A becomes the first lead amount Apk1 at the peak value frequency Fpk. With the phase lead compensator comprising the first phase lead compensator 136 and the second phase lead compensator 137, when performing secondary phase lead compensation, by having the lead amount Apk of each of the first phase lead compensator 136 and the second phase lead compensator 137 be the second lead amount Apk2, the lead amount A according to the peak value frequency Fpk is the first lead amount Apk1.

As shown in FIG. 5, in both the primary and secondary cases, the gain G becomes larger the larger that the lead amount A is. However, from around the time the lead amount A exceeds the prescribed value A1, the larger the lead amount A, the smaller the rising rate of the secondary gain G with respect to the rising rate of the primary gain G. In other words, the gain suppression effect by having the phase lead compensation be in secondary mode can be obtained when the lead amount A is greater than the prescribed value A1. Also, as shown in FIG. 4, when the lead amount A is smaller than the prescribed value A1, by having the phase lead compensation be in secondary mode, while the gain suppression effect cannot be obtained, an action occurs of a big decrease in the lead amount A at both sides of the peak value frequency Fpk. As a result, it is easier to reduce the lead amount A according to the frequency deviation between the actual PT resonance frequency Fpt and the peak value frequency Fpk, and it is easier for a reduction to occur in the effect of improving stability of the transmission ratio Ratio, in other words, the damping effect. For this reason, when the lead amount A of the primary phase lead compensation according to the feedback primary indicated pressure Ppri_FB is smaller than the prescribed value A1, while a gain suppression effect cannot be expected, by performing the primary phase lead compensation, the gain G decreases due to the frequency deviation, and the circumstance of the damping effect easily being reduced is avoided. The prescribed value A1 can be set in advance based on the characteristics of the gain G according to the lead amount A as shown in FIG. 5. The prescribed value A1 can be set within a range for which the gain suppression effect can be obtained by having the phase lead compensation in secondary mode, preferably to the minimum value.

In this way, for performing phase lead compensation, the lead amount determining unit 134 and the first switching unit 138 are configured specifically in the following manner. Specifically, the lead amount determining unit 134 makes a judgment to perform primary phase lead compensation when the lead amount A determined according to each parameter is less than the prescribed value A1, and determines the lead amount Apk to be the first lead amount Apk1. Also, the lead amount determining unit 134 makes a judgment to perform secondary phase lead compensation when the lead amount A is the prescribed value A1 or greater, and determines the lead amount Apk to be the second lead amount Apk2. The lead amount A can be set in advance using map data, etc.

The first switching unit 138 performs switching so as to perform phase lead compensation only by the first phase lead compensator 136 when the first lead amount Apk1 is selected. Also, the first switching unit 138 performs switching so as to perform phase lead compensation with the first phase lead compensator 136 and the second phase lead compensator 137 when the second lead amount Apk2 is selected. By configuring in this way, the first phase lead compensator 136 and the second phase lead compensator 137 are configured to perform phase lead compensation only with the first phase lead compensator 136 when the lead amount A is smaller than the prescribed value A1.

The first switching unit 138 may also be configured to perform phase lead compensation only with the second phase lead compensator 137 when performing primary phase lead compensation. The lead amount determining unit 134 may also input lead amount A to the first switching unit 138 instead of the lead amount Apk. The first switching unit 138 can also perform switching based on the lead amount A input in this way. By doing this, even if smoothing is implemented on the first lead amount Apk1 and the second lead amount Apk2, primary and secondary phase lead compensation can be performed as appropriate.

The first switching unit 138, together with the phase compensation on/off determination unit 133, has the feedback primary indicated pressure Ppri_FB for which lead compensation was performed by at least one of the first phase lead compensator 136 and the second phase lead compensator 137 according to the pulley state value M is set as the feedback primary indicated pressure Ppri_FB. At least one of the first phase lead compensator 136 and the second phase lead compensator 137 configures the lead compensation unit that performs lead compensation of the feedback primary indicated pressure Ppri_FB. The feedback primary indicated pressure Ppri_FB for which lead compensation was performed is output to the first phase delay compensator 145.

Figure 6:
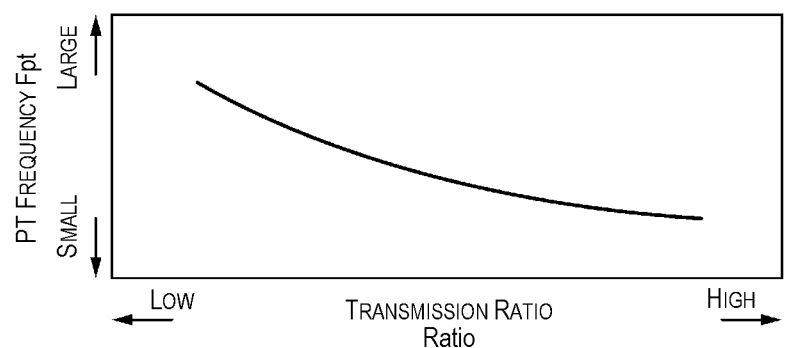
FIG. 6 is a drawing showing changes in a PT resonance frequency Fpt according to a transmission ratio Ratio.

The first peak value frequency determination unit 141 determines a peak value frequency Fpk1 of the phase lead compensation. FIG. 6 is a drawing showing the change in the PT resonance frequency Fpt according to the transmission ratio Ratio. As shown in FIG. 6, the PT resonance frequency Fpt is smaller the larger that the transmission ratio Ratio is. For this reason, the first peak value frequency determination unit 141 makes the peak value frequency Fpk1 smaller the larger that the transmission ratio Ratio is. By doing this, even if the PT resonance frequency Fpt changes according to the transmission ratio Ratio, it is possible to suppress as appropriate the frequency deviation between the PT resonance frequency Fpt and the peak value frequency Fpk1. The transmission ratio Ratio, in specific terms, has the target transmission ratio Ratio_D input from the target value generating unit 131. The peak value frequency Fpk1 determined by the first peak value frequency determination unit 141 is input respectively to the first phase lead compensator 136 and the second phase lead compensator 137. By doing this, the first peak value frequency determination unit 141 is configured so as to set the peak value frequency Fpk of the respective phase lead compensations performed by the first phase lead compensator 136 and the second phase lead compensator 137 based on the transmission ratio Ratio.

However, the PT resonance frequency Fpt set as a targeted frequency for the peak value frequency Fpk does not necessarily match the actual PT resonance frequency Fpt. As a result, when performing the secondary phase lead compensation, the circumstance occurs of a reduction in the lead amount A explained next due to frequency deviation between the actual PT resonance frequency Fpt and the peak value frequency Fpk.

Figure 7:
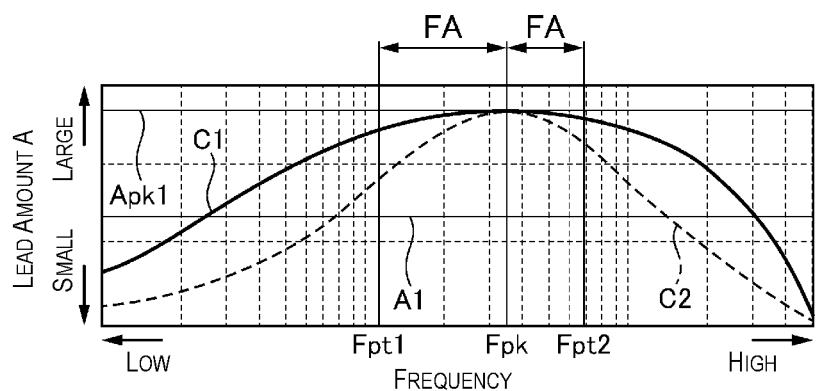
FIG. 7 is an explanatory drawing of the effect caused by deviation of the peak value frequency Fpk.

FIG. 7 is an explanatory drawing of the effect caused by deviation of the peak value frequency Fpk. A PT resonance frequency Fpt1 shows a case when the actual PT resonance frequency Fpt was lower than the peak value frequency Fpk, and a PT resonance frequency Fpt2 shows a case when the actual PT resonance frequency Fpt was higher than the peak value frequency Fpk. A size FA of the frequency deviation amount between these is the same. As shown in FIG. 7, when performing the secondary phase lead compensation, even when the size FA of the deviation amount is the same, the reduction amount of the lead amount A is greater when the actual PT resonance frequency Fpt is the PT resonance frequency Fpt1 than when it is the PT resonance frequency Fpt2. For this reason, when the second lead amount Apk2 is input, in other words, when the secondary phase lead compensation is performed, the first peak value frequency determination unit 141, by having the peak value frequency Fpk be lower than when performing primary phase lead compensation, makes it so that the lead amount A is not greatly reduced in a biased mode according to the frequency deviation direction.

The delay amount determination unit 142 determines a delay amount Bpk. The delay amount determination unit 142 is provided in the wake of the phase compensation on/off determination unit 133. The delay amount determination unit 142 is provided in this way in light of placement in the signal path. The delay amount determination unit 142 determines the delay amount Bpk according to the on/off command, said another way, according to the on/off determination of the phase compensation. The delay amount determination unit 142 determines the delay amount Bpk to be zero when the off command is input. The delay amount determination unit 142 determines the delay amount Bpk according to the operating state of the vehicle when the on command is input. As parameters indicating the operating state of the vehicle, input to the delay amount determination unit 142 are the FB gain G_FB, the rotation speed Npri, the input torque Tsec, the transmission ratio Ratio, the secondary pressure Psec, the vehicle acceleration, the brake operating state, the primary pressure Ppri, the engine torque, the torque ratio of the torque converter, the engagement state of the LU clutch 2a, the oil temperature TMP, etc. The delay amount determination unit 142 determines the delay amount Bpk according to this plurality of parameters. Said another way, the delay amount Bpk is made to vary according to the operating state of the vehicle. The delay amount determination unit 142 may also have the delay amount Bpk be varied according to any one of this plurality of parameters.

The delay amount determination unit 142, by determining the delay amount Bpk according to each parameter, is able to make this variable according to the operating state, and can set the delay amount B at the targeted frequency. When increasing the delay amount B, this is limited to a range for which stable operation is possible, considering the relationship with the specific specifications of the transmission ratio control system 100 such as the variator 20, etc. This limit can be found in advance by calculation or experimentation as the limit amount according to each parameter. The delay amount Bpk is determined by further reducing the delay amount Bpk actually determined according to each parameter by the amount of the limit amount set according to each parameter.

The delay amount determination unit 142 determines a first delay amount Bpk1 and a second delay amount Bpk2 based on the determined delay amount Bpk. The first delay amount Bpk1 is set corresponding to when performing the primary phase delay compensation described later, and the second delay amount Bpk2 is set corresponding to when performing the secondary phase delay compensation described later. The second delay amount Bpk2 is set to ½ the first delay amount Bpk1. The delay amount Bpk determined according to each parameter is set so as to correspond with the second delay amount Bpk2. The delay amount Bpk determined according to each parameter may also be set so as to correspond to the first delay amount Bpk1. The delay amount Bpk is input from the delay amount determination unit 142 to the delay amount filter unit 143.

Figure 11:
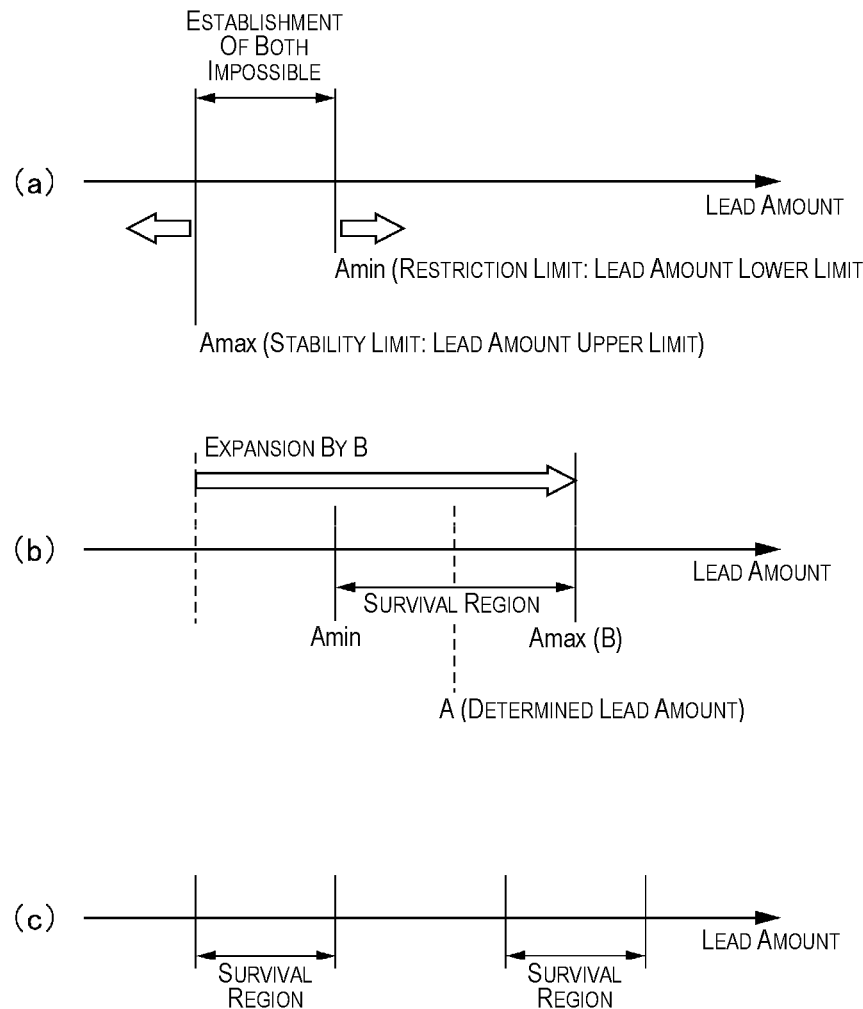
FIG. 11 is an explanatory drawing representing the relationship between the lead amount and the delay amount when performing phase lead compensation.

Here, the relationship between the lead amount A and the delay amount B is explained. FIG. 11 is an explanatory drawing representing the relationship between the lead amount and the delay amount when performing phase lead compensation. The phase lead compensation unit sets the lead amount A according to the traveling state. Here, the minimum lead amount necessary to suppress vehicle vibration is defined as the damping limit. Thus, when the lead amount A is smaller than a minimum lead amount Amin representing the damping limit, the damping function cannot by obtained by phase lead compensation, causing vibration by overlapping with the PT resonance frequency Fpt.

Also, the maximum lead amount that can secure both the robustness at which feedback control does not fail, and the disturbance suppression that can sufficiently stabilize the primary rotation count Npri is defined as the stability limit. In particular, for disturbance suppression performance, there is a performance required for marketability of the vehicle, and there is a limit for lowering low frequency feedback gain G_FB. Thus, when the lead amount A becomes greater than a maximum lead amount Amax that represents the stability limit, the damping function by phase lead compensation cannot be obtained due to divergence of command signals, and it is difficult to output appropriate command signals.

Thus, when setting the lead amount A, it is set to a value that is greater than the minimum lead amount Amin and smaller than the maximum lead amount Amax. In the traveling state thought to be most common during normal travel, upon thorough examination by the inventor, with almost all traveling states, a relationship of Amin<Amax is obtained, so it is possible to set an appropriate lead amount A.

However, as shown in FIG. 11(a), depending on the traveling state, there are traveling states for which Amin>Amax. In this case, if the lead amount required with the damping limit exceeds the stability limit, there is not a survival region that is a region for which damping ability and stabilization ability can both be established, so it is difficult to perform appropriate phase lead compensation. In light of that, with the embodiment, phase delay compensation was performed. By doing this, it is possible to improve robustness and to raise the stability limit without making the gain of the low frequency component small.

FIG. 11(b) is a drawing representing a case when the stability limit is raised by the delay amount. In this way, when the delay amount B is 0, by raising the Amax by the delay amount B for an item that was in a relationship of Amax<Amin, the stability limit after raising is Amax(B). By doing this, it is possible to obtain a relationship of Amin<Amax(B). Thus, it is possible to ensure a survival region, and possible to set an appropriate lead amount A. When setting the delay amount B, the difference between Amax(B) and Amin is set to be a prescribed amount or greater. By doing this, by ensuring a range that the lead amount A can take, it is possible to set an appropriate lead amount A according to the traveling state. With the embodiment, as the lead amount A, an example is shown of setting an intermediate value between Amin and Amax(B), but this is not limited to being an intermediate value, and it is also possible to set the lead amount A that emphasizes the stability limit and is near Amax(B), and also possible to set the lead amount A that emphasizes the damping limit and is near Amin.

Here, as shown in FIG. 11(c), the survival region appears in various regions according to the traveling state of the vehicle, so when the delay amount B is a fixed value, it is not possible to handle a plurality of survival regions. In light of that, with the embodiment, by having the lead amount A and the delay amount B be variable, it is possible to handle a plurality of survival regions, and damping properties and control stability are ensured. For example, a method such as the following can be used for realization as the automatic adjustment function of the lead amount and the delay amount.

(a) When the PT resonance is detected by the PT resonance detection unit 150, the lead amount A is made larger until the PT resonance stops, and the minimum value for which the PT resonance detection does not occur is set as the lead amount A.

(b) During PT resonance detection, when the divergence detection unit 152 detects divergence by an increase in the lead amount A, the delay amount B is made larger until the divergence stops, and the minimum value for which divergence does not occur is set as the delay amount B.

(c) During the divergence detection of the abovementioned (b), when oil vibration is detected by the oil vibration detection unit 151, by releasing the LU clutch 2a, and turning off the phase delay compensator, phase delay is eliminated.

It is also possible to use an automatic adjustment function that combines the lead amount, the delay amount, and the feedback gain G_FB.

(a1) When PT resonance is detected by the PT resonance detection unit 150, the lead amount A is made larger until the PT resonance stops, and the minimum value for which PT resonance detection does not occur is set as the lead amount A.

(b1) During PT resonance detection, when the divergence detection unit 152 detects divergence by an increase in the lead amount A, the delay amount B is made larger until the divergence stops, and the minimum value for which divergence does not occur is set as the delay amount B.

(c1) During the divergence detection of the abovementioned (b1), when oil vibration is detected by the oil vibration detection unit 151, the delay amount B is set to a maximum value for which low frequency vibration does not occur.

(d1) During the abovementioned (c1), when in a state when the delay amount B is set up to the low frequency vibration limit, the feedback gain G_FB is decreased.

(e1) The abovementioned (a1) to (d1) are repeated, searching for a control state in which PT resonance detection, divergence detection, and oil vibration detection stop.

(f1) When any of the PT resonance detection, divergence detection, or oil vibration detection does not stop despite performing the abovementioned search, by releasing the LU clutch 2a, and turning off the phase delay compensator, phase delay is eliminated.

In the case of this automatic adjustment function that combines the lead amount, the delay amount, and the feedback gain G_FB, there is the following advantage compared to when simply controlling only with the lead amount and the delay amount. For example, when the lead compensator is operated to suppress PT resonance, robustness is degraded. To address this, it is necessary to set the limit of the 8 Hz vibration range to ½, for example. If, for example, only the feedback gain G_FB is set to ½, the low frequency component is also ½. Having done this, there is a significant decrease in the disturbance suppression performance, and offset occurs. Specifically, there is a risk that the feedback action of the low frequency component cannot be obtained, and that a steady deviation will always remain. In light of that, the limit for lowering the feedback gain G_FB is 0.7, and the remaining 0.7 times is secured by phase delay compensation. Having done that, the high frequency is 0.7×0.7≈0.5, and it is possible to ensure disturbance suppression performance without generating offset.

The delay amount filter unit 143 is provided in the wake of the delay amount determination unit 142, and performs filter processing of the delay amount Bpk. The delay amount filter unit 143 is provided in this way in light of placement in the signal path. The delay amount filter unit 143 is specifically a low pass filter unit, and is configured using a first order low pass filter, for example. By performing filter processing of the delay amount Bpk, when on/off of the phase compensation is switched, the delay amount filter unit 143 configures a gain smoothing unit for performing smoothing of changes in gain of the phase delay compensation according to determination of on/off of phase compensation. By performing smoothing of changes in gain, there is suppression of the change amount of the gain accompanying switching of on/off of the phase compensation.

Figure 8:
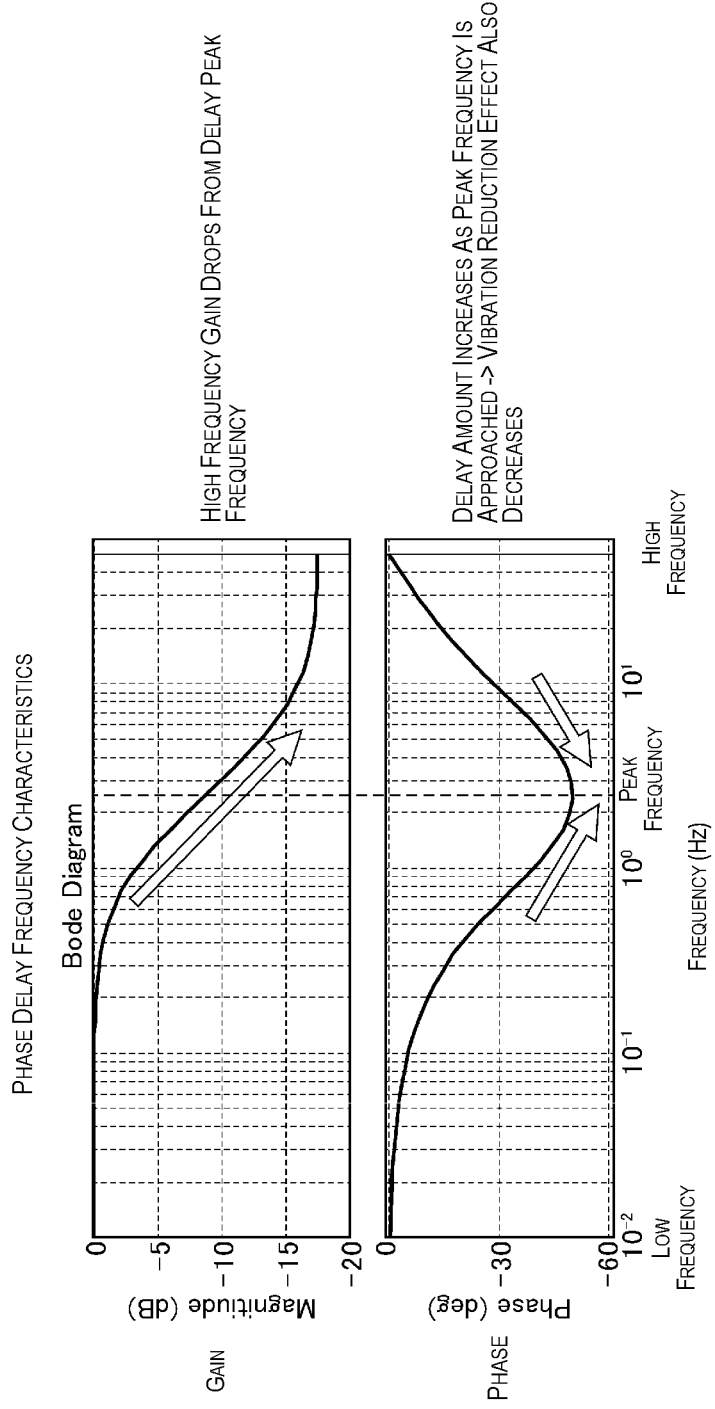
FIG. 8 is a drawing representing phase delay frequency characteristics.

The second peak value frequency determination unit 144 determines the peak value frequency Fpk2 of the phase delay compensation. The second peak value frequency determination unit 144 changes the peak value frequency Fpk2 by determining the peak value frequency Fpk2 according to the peak value frequency Fpk1. FIG. 8 is a drawing representing phase delay frequency characteristics. When the first phase lead compensator 136 and/or the second phase lead compensator 137 (hereafter also noted as simply "phase lead compensator") are turned on, it is possible to reduce vehicle vibration due to PT resonance in the PT resonance occurrence region. However, because high frequency gain rises, control becomes destabilized. In light of that, when the first phase delay compensator 145 and/or the second phase delay compensator 146 (hereafter also noted simply as "phase delay compensator") are turned on, by lowering the high frequency gain of the delay peak value frequency Fpk2 or greater, it is possible to suppress destabilization of control.

However, low frequency responses slower than the PT resonance frequency become vibrational, and the amount advanced by the phase lead compensator is reduced. Also, there is a frequency at which the delay amount becomes the peak in the phase delay compensator, and the farther away from that peak value, the more the delay amount is reduced. In addition, the PT resonance frequency changes according to the transmission ratio Ratio. For that reason, when the delay peak value frequency Fpk2 of the phase delay compensator is fixed, the PT resonance frequency Fpt changes according to the transmission ratio changes, and ends up approaching the delay peak value frequency Fpk2. If, for example, the delay peak value frequency Fpk2 and the PT resonance frequency Fpt approach each other, the closer they are, the more the delay amount increases, reducing the vehicle vibration reduction effect. To avoid this, when the delay peak value frequency Fpk2 is set to be slower than necessary, by the effect of lowering the gain of peak value frequency Fpk2 or greater, the gain of the frequency necessary for control decreases. In light of that, because vehicle vibration is reduced without lowering the gain of the necessary frequency, the peak value frequency Fpk2 of the phase delay compensator was applied to the PT resonance frequency, the phase lead amount, and the phase delay amount.

Figure 9:
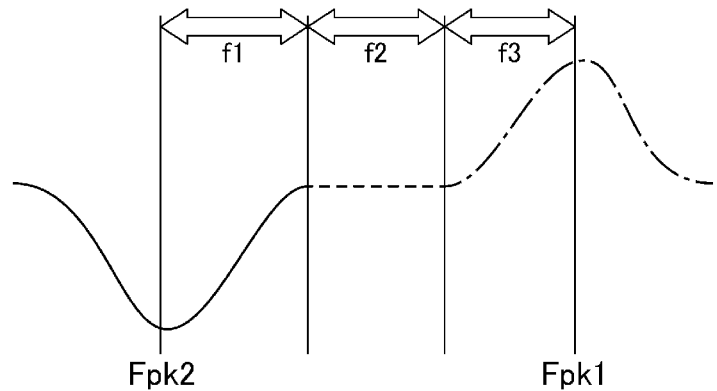
FIG. 9 is a drawing representing the relationship between the peak value frequency of lead compensation and the peak value frequency of delay compensation.

FIG. 9 is a drawing representing the relationship between the peak value frequency of the lead compensation and the peak value frequency of the delay compensation. The horizontal axis is frequency, and the vertical axis is phase. The lead compensation is shown by the dot-dash line, and the delay compensation is shown by the solid line. It is preferable that the relationship between the peak value frequency Fpk1 in the lead compensator and the peak value frequency Fpk2 of the phase delay compensator be the relationship shown in FIG. 9. This is because in this case, it is possible to avoid the lead amount of the peak value frequency Fpk1 and the delay amount of the peak value frequency Fpk2 from overlapping on the frequency axis, so the two do not cancel each other. f2 in FIG. 9 is a frequency that should be separated from the lead amount and the delay amount. f2 is a fixed value, and is 1/10 of the PT resonance frequency Fpt. f1 is a frequency for which the peak value frequency Fpk2 should be separated from the f2 low frequency side end part. f3 is a frequency for which the peak value frequency Fpk1 should be separated from the f2 high frequency side end part. When the lead amount is A, and the delay amount is B, f1, f2, f3 are expressed by the following relational expression.

$$f1 = Fpk2\{(1+\sin B)/(1-\sin B)\}^{1/2}$$

$$f2 = Fpt/10$$

$$f3 = Fpk1\{(1+\sin A)/(1-\sin A)\}^{1/2}$$

Here, in actuality, the peak value frequency Fpk1 of the high frequency side is set between 2 to 5 Hz, for example, and the lead amount A is determined. With this value as a reference, the peak value frequency Fpk2 and the delay amount B of the low frequency side corresponding to the position separated by the amount of the value for which f1, f2, and f3 are added are determined. By doing this, it is possible to set an appropriate position for the peak value frequencies Fpk2 and Fpk1, and possible to ensure an appropriate control gain while ensuring the vehicle vibration reduction effect.

The peak value frequency Fpk2 determined by the second peak value frequency determination unit 144 is input respectively to the first phase delay compensator 145 and the second phase delay compensator 146. By doing this, the second peak value frequency determination unit 144 is configured to set the peak value frequency Fpk2 of the respective phase delay compensations performed by the first phase delay compensator 145 and the second phase delay compensator 146 based on the transmission ratio Ratio.

The delay amount Bpk from the delay amount filter unit 143 is input to the first phase delay compensator 145, the second phase delay compensator 146, and the second switching unit 147. The peak value frequency Fpk2 from the second peak value frequency determination unit 144 is also input to the first phase delay compensator 145 and the second phase delay compensator 146. The primary phase delay compensation of the feedback primary indicated pressure Ppri_FB is performed based on the delay amount Bpk input for both the first phase delay compensator 145 and the second phase delay compensator 146, and further on the input peak value frequency Fpk2. By performing phase delay compensation of the feedback primary indicated pressure Ppri_FB, phase delay compensation of the feedback transmission control of the transmission 4 is performed. The first phase delay compensator 145 and the second phase delay compensator 146 are specifically configured by a primary filter, and by performing filter processing according to the input delay amount Bpk, and further to the input peak value frequency Fpk2, the primary phase delay compensation of the feedback primary indicated pressure Ppri_FB is performed.

The second phase delay compensator 146 is provided in series with the first phase delay compensator 145. The second phase delay compensator 146 is provided in this way in light of placement in the signal path. The second phase delay compensator 146 has input the feedback primary indicated pressure Ppri_FB for which primary phase delay compensation was performed by the first phase delay compensator 145. Therefore, when the second phase delay compensator 146 performs the primary phase delay compensation of the feedback primary indicated pressure Ppri_FB, it further performs the primary phase delay compensation again. By doing this, the secondary phase delay compensation of the feedback primary indicated pressure Ppri_FB is performed. The second phase delay compensator 146 configures the delay compensation unit together with the first phase delay compensator 146.

Figure 10:
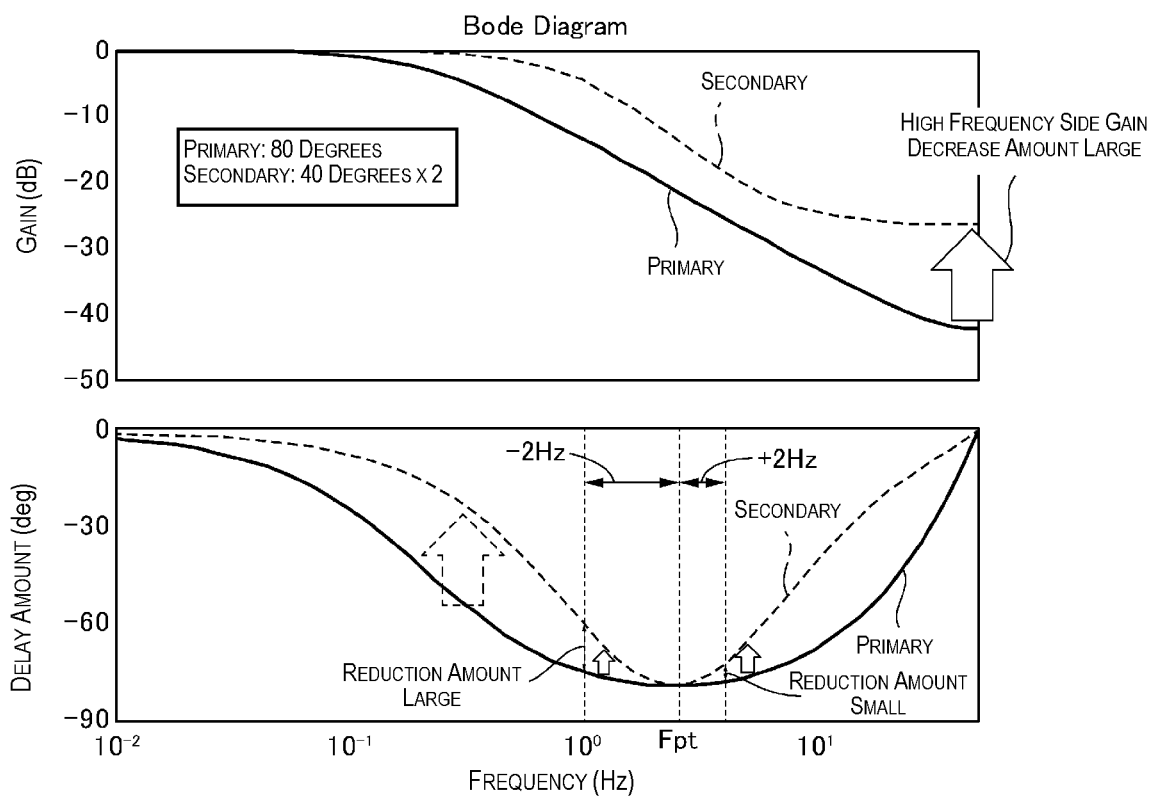
FIG. 10 is a Bode diagram showing the frequency characteristics of a phase delay compensator.

FIG. 10 is a Bode diagram showing the frequency characteristics of the phase delay compensator. For example, when performing only primary phase delay compensation for an 80 degree delay amount, the phase delay in a frequency region of other than the PT resonance frequency Fpt, said another way, other than the targeted frequency, becomes larger. This trend is particularly marked at further to the low frequency side than the PT resonance frequency Fpt. Having done that, there is the problem of control excitation occurring easily. In contrast to this, to achieve the 80 degree delay amount, when the first phase delay compensator 145 and the second phase delay compensator 146 set to a 40 degree delay amount are placed in series, the phase delay of the frequency region of other than the PT resonance frequency Fpt, particularly the low frequency side, becomes smaller, and it is possible to avoid control excitation.

However, when the actual PT resonance frequency Fpt is deviated particularly further to the low frequency side than the targeted PT resonance frequency Fpt, the reduction amount of the delay amount B become larger. Specifically, in the case shown in FIG. 10 when there is deviation of for example +2 Hz further to the high frequency side than the targeted PT resonance frequency Fpt, the reduction amount of the delay amount B is small, but with deviation of −2 Hz to the low frequency side, we can see that the reduction amount of the delay amount B is large. Also, for gain as well, the decrease amount particularly to the high frequency side becomes large, and there is the risk that the robustness of the transmission ratio control system 100 will decrease. In light of that, in the second peak value frequency determination unit 144, when the peak value frequency Fpk2 is determined, the determination is made to be a frequency lower than a preset value. In other words, by having the peak value frequency Fpk be lower than when performing primary phase lead compensation when performing secondary phase lead compensation, there is not a big reduction in the delay amount B in a biased mode according to the frequency deviation direction. By doing this, even if the actual PT resonance frequency Fpt deviates from the targeted PT resonance frequency Fpt, it is possible to suppress deviation to the low frequency side, and possible to ensure the robustness of the transmission control system 100.

The second switching unit 147 switches between when performing phase delay compensation by the first phase delay compensator 145 and the second phase delay compensator 146 according to the input delay amount Bpk, in other words, when performing secondary phase delay compensation, and when performing phase delay compensation only by the first phase delay compensator 145, in other words, when performing the primary phase delay compensation. By performing secondary phase delay compensation, compared to when performing primary phase delay compensation, it is possible to narrow the range affected by the delay amount. Thus, it is possible to avoid immediately reaching the stable limit without needing to lower the peak frequency Fpk2. Also, when the delay amount B of the primary phase delay compensation according to the feedback primary indicated pressure Ppri_FB is smaller than a prescribed value B1, phase delay compensation is performed only with the first phase delay compensator 145, and when the delay amount B is greater than the prescribed value B1, secondary phase delay compensation is performed using the second phase delay compensator.

In this way, for performing phase delay compensation, the delay amount determination unit 142 and the second switching unit 147 are specifically configured as follows. Specifically, the delay amount determination unit 142 makes a judgment to perform primary phase delay compensation when the delay amount B determined according to each parameter is smaller than the prescribed value B1, and determines that the delay amount Bpk is the first delay amount Bpk1. Also, the delay amount determination unit 142 makes a judgment to perform the secondary phase delay compensation when the delay amount B is the prescribed value B1 or greater, and determines that the delay amount Bpk is the second delay amount Bpk2. The delay amount B can be set in advance using map data, etc.

The second switching unit 147 performs switching so that when the first delay amount Bpk1 is selected, phase delay compensation is performed only by the first phase delay compensator 145. Also, when the second delay amount Bpk2 is selected, the second switching unit 147 performs switching so that phase delay compensation is performed by the first phase delay compensator 145 and the second phase delay compensator 146. By configuring in this way, the first phase delay compensator 145 and the second phase delay compensator 146 are configured to perform phase delay compensation only by the first phase delay compensator 145 when the delay amount B is smaller than the prescribed value B1. Specifically, the more the delay amount of the phase delay compensator increases, the more it is possible to reduce the phase delay of the peak frequency range. For that reason, since the low frequency phase delay for which control excitation occurs is eliminated, control excitation does not occur easily. However, from when the delay amount exceeds 40 deg., for example, the drop amount of high frequency gain is reduced, decreasing robustness. Thus, when the delay amount is lower than 40 deg., the demerits of changing to secondary mode are stronger, so only the first phase delay compensator 145 is used.

The second switching unit 147 may also be configured to perform phase delay compensation only by the second phase delay compensator 146 when performing primary phase delay compensation. The delay amount determination unit 142 may also have the delay amount B input to the second switching unit 147 instead of the delay amount Bpk. The second switching unit 147 may also perform switching based on the delay amount B input in this way. By doing this, even if smoothing is implemented on the first delay amount Bpk1 or the second delay amount Bpk2, the primary and secondary phase delay compensation can be performed as appropriate.

The second switching unit 147, together with the phase compensation on/off determination unit 133, configures a setting unit that sets as the feedback primary indicated pressure Ppri_FB the feedback primary indicated pressure Ppri_FB for which delay compensation was performed by at least one of the first phase delay compensator 136 and the second phase delay compensator 137 according to the pulley state value M. At least one of the first phase delay compensator 136 and the second phase delay compensator 137 configures the delay compensation unit that performs the delay compensation of the feedback primary indicated pressure Ppri_FB. The feedback primary indicated pressure Ppri_FB for which delay compensation was performed configures the feedback command value after compensation.

Input to the actuator 111 are the feedback primary indicated pressure Ppri_FB selected from the first switching unit 138, and a primary indicated pressure Ppri_FF (not illustrated) set based on the target transmission ratio Ratio_D (the target primary indicated pressure that determines balance thrust or transmission ratio). The actuator 111 is a primary pressure control valve that controls the primary pressure Ppri provided in the hydraulic control circuit 11, for example, and controls the primary pressure Ppri so that the actual pressure Ppri_A of the primary pressure Ppri becomes the indicated pressure Ppri_D according to the target transmission ratio Ratio_D. By doing this, the transmission ratio Ratio is controlled so that the actual transmission ratio Ratio_A becomes the target transmission ratio Ratio_D.

A sensor unit 40 detects the actual transmission ratio Ratio_A of the variator 20. The sensor unit 40 is specifically configured by the rotation speed sensor 42 and the rotation speed sensor 43. The actual transmission ratio Ratio_A that is the actual value (sensor value) of the transmission ratio detected by the sensor unit 40 is input to the sensor value filter unit 140. An on/off command is also input via the on/off command filter unit 139 to the sensor value filter unit 140.

The on/off command filter unit 139 outputs an on command to the sensor value filter unit 140 when the lead compensation is on, outputs an off command to the sensor value filter unit 140 when the lead compensation is off. Specifically, when the phase delay compensator is turned on, as shown in FIG. 8, to lower high frequency gain, a gain change occurs. For that reason, when the on/off command value hunting is done vibrationally, vibration of gain change in accordance with that occurs, and noise according to the hunting period occurs. In light of that, with the on/off command filter unit 139, to reduce noise according to the hunting period that occurs during on/off switching, output is done via the low pass filter.

The sensor value filter unit 140 performs filter processing of the actual transmission ratio Ratio_A. With the sensor value filter unit 140, the mode of the filter processing is changed according to the on/off command. In specific terms, with the sensor value filter unit 140, the filter processing order or execution/stopping is switched according to the on/off command. The sensor value filter unit 140 is a first order low pass filter when the off command is input, and is a higher order low pass filter or filter processing is stopped when the on command is input.

By configuring the sensor value filter unit 140 in this way, when a first order low pass filter is used, a slight delay occurs in the region of a frequency to be removed or lower, whereas when the on command is input, delay is improved. As a result, it is possible to further advance the phase of the feedback primary indicated pressure Ppri_FB. The sensor value filter unit 140 can be a configuration having one or a plurality of first order low pass filters provided with the ability to switch on/off or the order of the filter processing, for example. The actual transmission ratio Ratio_A from the sensor value filter unit 140 is input to the FB compensator 132.

With the PT resonance detection unit 150, the vibration component of longitudinal acceleration G detected by the G sensor 53 is extracted, and when the state of the amplitude of the vibration component being a prescribed value continues for a prescribed time or longer, it is judged that vibration is occurring. On the other hand, when the state of the amplitude of the vibration component being less than the prescribed value continues for a prescribed time or longer, it is judged that vibration is not occurring.

With the oil vibration detection unit 151, first, the voltage signal detected by the hydraulic sensor 52 is converted to a hydraulic signal, the DC component (fluctuating component according to the control command) is removed by the bandpass filter processing, and only the vibration component is extracted. Then, the amplitude of the vibration component is calculated, and when the state of the amplitude of the hydraulic signal being the prescribed amplitude or greater continues for a prescribed time or longer, it is judged that oil vibration is occurring. On the other hand, when oil vibration is occurring, when the state of the amplitude being less than the prescribed amplitude continues for the prescribed time or longer, it is judged that oil vibration is not occurring. As the hydraulic signal, it is possible to use the primary pulley hydraulic pressure, or to use both.

With the divergence detection unit 152, a detection is made of whether the final command signal is diverging. Here, divergence of the command signal is detected based on whether the frequency is a prescribed value or greater, and whether the state of the amplitude being a prescribed value or greater has continued for a prescribed time.

As explained above, with the embodiment, the following operational effects are obtained.

(1) The control device of a continuously variable transmission that performs feedback control of the transmission 4 so that the actual pressure Ppri_A becomes the indicated pressure Ppri_D, comprising
  a phase lead compensation unit that performs phase lead compensation of the feedback control,
  a phase delay compensation unit that performs phase delay compensation of the feedback control, and
  the phase compensation on/off determination unit 133 that stops compensation by the phase delay compensation unit when an unstable traveling state of the vehicle is detected, and restores phase delay compensation when the vehicle traveling state has changed.

Thus, it becomes possible to stabilize control, making it possible to stabilize vehicle behavior.

(2) After compensation by the phase delay compensation unit is stopped, the phase compensation on/off determination unit 133 stops compensation by the phase lead compensation unit when an unstable traveling state of the vehicle is detected, and restores phase lead compensation and phase delay compensation when the vehicle traveling state has changed.

Thus, if the traveling state is changed while avoiding the unstable traveling state of the vehicle, there is a high possibility of being separated from the traveling state in which vibration occurs, so by restoring the phase lead compensation and the phase delay compensation, it is possible to output phase compensation signals in a larger number of traveling states.

(3) After compensation by the phase delay compensation unit is stopped, the phase compensation on/off determination unit 133 stops compensation by the phase lead compensation unit when an unstable traveling state of the vehicle is detected, and may also be made to restore only the phase lead compensation when the vehicle traveling state has changed.

By doing this, it is possible to suppress vehicle vibration.

(4) The phase compensation on/off determination unit 133 changes the restoration condition of the stopped compensation according to the detected unstable traveling state of the vehicle.

Specifically, even in a case when there is judged to be an unstable traveling state of the vehicle, restoration is limited to when an unstable state appears as actual vehicle behavior, and by allowing restoration when there is an unstable state in terms of control, but not reflected in actual vehicle behavior, it is possible to ensure a traveling state in which phase compensation is possible while avoiding an unstable state.

(5) After phase compensation is stopped, when the operating point M set based on the vehicle speed and accelerator pedal opening value is changed, the phase compensation on/off determination unit 133 restores compensation.

Specifically, if the operating point M is changed, there is a high possibility of being separated from the traveling state in which vibration occurs, so it is possible to output phase compensation signals in a larger number of traveling states.

(6) After phase compensation is stopped, when the range position of the select lever operated by the driver has changed, the phase compensation on/off determination unit 133 restores phase compensation.

Specifically, if the range position is changed, there is a high possibility of being separated from the traveling state in which vibration occurs, so it is possible to output phase compensation signals in a larger number of traveling states.

(7) Having the torque converter 2 with the LU clutch 2*a* between the engine 1 (power source) and the transmission 4, when stopping the phase compensation, the phase compensation on/off determination unit 133 releases the LU clutch 2*a*, and after releasing the LU clutch 2*a*, for the engagement timing for engaging the LU clutch 2*a* based on the restoration conditions, the re-engagement timing when vehicle vibration is detected as an unstable traveling state of the vehicle is later than the re-engagement timing when oil vibration is detected as an unstable traveling state of the vehicle when phase compensation is stopped.

In specific terms, after vehicle vibration is detected, by prohibiting engagement of the LU clutch 2*a* until the next time the ignition switch is turned off, the effect on actual vehicle behavior is avoided. Meanwhile, after divergence is detected for oil vibration, when divergence of oil vibration is no longer detected thereafter, engagement of the LU clutch 2*a* is allowed with a change in the operating point M or the range position as a condition. Specifically, if there is a state in which vibration does not necessarily appear in vehicle behavior, if oil vibration or divergence are not detected, even if an opportunity is given to engage the LU clutch 2*a*, the effect on vehicle behavior is small. Thus, while suppressing the effect on vehicle behavior, it is possible to improve fuel consumption by making it easier to ensure the engagement state of the LU clutch 2*a*.

Other Embodiments

Above, a mode for carrying out the present invention was explained based on the embodiment, but the specific configuration of the present invention is not limited to the configuration shown in the embodiment, and even if there are design changes, etc., in a range that does not depart from the gist of the invention, these are included in the present invention.

With the embodiment, the first peak value frequency determination unit 141 determined the peak value frequency Fpk1 according to the target transmission ratio Ratio_D, but it is also possible to determine the peak value frequency Fpk1 based on the actual transmission ratio Ratio_A. By doing this, even in a case when there is divergence between the target transmission ratio Ratio_D and the actual transmission ratio Ratio_A, it is possible for the peak value frequency Fpk1 to approach the targeted frequency.

Also, with the embodiment, a configuration was shown in which servo system feedback control is performed based on the transmission ratio, but it is also possible to have a configuration in which feedback control is performed according to fluctuation of the input torque. Also, with the embodiment, an example of the abovementioned control being configured within the transmission controller 12 was shown, but it is also possible to realize this with a plurality of controllers.

The invention claimed is:

1. A control device for a continuously variable transmission that performs feedback control so that an actual transmission control value becomes a target transmission control value, the control device for a continuously variable transmission comprising:
   an automatic transmission controller including a central processing unit (CPU), the automatic transmission controller constituting
   a phase lead compensation unit configured to perform phase lead compensation of the feedback control;
   a phase delay compensation unit configured to perform phase delay compensation of the feedback control; and
   a phase compensation on/off determination unit configured to stop the phase delay compensation by the phase delay compensation unit when an unstable traveling state of a vehicle is detected, and to restore the phase delay compensation when a traveling state of the vehicle has changed, the unstable traveling state being detected based on vehicle vibration or oil vibration.

2. The control device for a continuously variable transmission of claim 1, wherein
   after stopping the phase delay compensation by the phase delay compensation unit, when the unstable traveling state of the vehicle is detected, the phase compensation on/off determination unit is configured to stop the phase lead compensation by the phase lead compensation unit, and when the traveling state of the vehicle has changed, to restore the phase lead compensation and the phase delay compensation.

3. The control device for a continuously variable transmission of claim 1, wherein
   after stopping the phase delay compensation by the phase delay compensation unit, when the unstable traveling state of the vehicle is detected, the phase compensation on/off determination unit is configured to stop the phase lead compensation by the phase lead compensation unit, and when the traveling state of the vehicle has changed, to restore only the phase lead compensation.

4. The control device for a continuously variable transmission of claim 1, wherein
the phase compensation on/off determination unit is configured to change restoration conditions of the phase delay compensation according to the unstable traveling state of the vehicle detected.

5. The control device for a continuously variable transmission of claim 4, wherein
after stopping the phase delay compensation, the phase compensation on/off determination unit is configured to restore the phase delay compensation when an operating point set based on a vehicle speed and an accelerator pedal opening value has changed.

6. The control device for a continuously variable transmission of claim 4, wherein
after stopping the phase delay compensation, the phase compensation on/off determination unit is configured to restore the phase delay compensation when a range position of a select lever operated by a driver has changed.

7. The control device for a continuously variable transmission of claim 4, wherein
the vehicle includes a torque converter with a lock-up clutch between a power source and the continuously variable transmission, and
when stopping the phase delay compensation, the phase compensation on/off determination unit is configured to release the lock-up clutch, and after releasing the lock-up clutch, for an engagement timing for engaging the lock-up clutch based on restoration conditions, a re-engagement timing when the vehicle vibration is detected as the unstable traveling state of the vehicle is later than a re-engagement timing when the oil vibration is detected as the unstable traveling state of the vehicle when the phase delay compensation is stopped.

8. A control method for a continuously variable transmission for performing feedback control so that an actual transmission control value becomes a target transmission control value, the control method comprising:
performing, by an automatic transmission controller including a central processing unit (CPU), phase lead compensation of the feedback control and phase delay compensation of the feedback control;
when an unstable traveling state of a vehicle is detected based on vehicle vibration or oil vibration, stopping, by the automatic transmission controller, the phase delay compensation; and
when a traveling state of the vehicle has changed after the stopping of the phase delay compensation, restoring, by the automatic transmission controller, the phase delay compensation.

9. The control device for a continuously variable transmission of claim 2, wherein
the phase compensation on/off determination unit is configured to change restoration conditions of the phase delay compensation and the phase lead compensation according to the unstable traveling state of the vehicle detected.

10. The control device for a continuously variable transmission of claim 9, wherein
after stopping at least one of the phase delay compensation and the phase lead compensation, the phase compensation on/off determination unit is configured to restore the at least one of the phase delay compensation and the phase lead compensation when an operating point set based on a vehicle speed and an accelerator pedal opening value has changed.

11. The control device for a continuously variable transmission of claim 9, wherein
after stopping at least one of the phase delay compensation and the phase lead compensation, the phase compensation on/off determination unit is configured to restore at least one of the phase delay compensation and the phase lead compensation when a range position of a select lever operated by a driver has changed.

12. The control device for a continuously variable transmission of claim 9, wherein
the vehicle includes a torque converter with a lock-up clutch between a power source and the continuously variable transmission, and
when stopping at least one of the phase delay compensation and the phase lead compensation, the phase compensation on/off determination unit is configured to release the lock-up clutch, and after releasing the lock-up clutch, for an engagement timing for engaging the lock-up clutch based on restoration conditions, a re-engagement timing when the vehicle vibration is detected as the unstable traveling state of the vehicle is later than a re-engagement timing when the oil vibration is detected as the unstable traveling state of the vehicle when at least one of the phase delay compensation and the phase lead compensation is stopped.

* * * * *